(12) United States Patent
Ur et al.

(10) Patent No.: US 9,990,772 B2
(45) Date of Patent: Jun. 5, 2018

(54) AUGMENTED REALITY SKIN EVALUATION

(71) Applicant: EMPIRE TECHNOLOGY DEVELOPMENT LLC, Wilmington, DE (US)

(72) Inventors: Shmuel Ur, Galil (IL); Yoav Medan, Haifa (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 156 days.

(21) Appl. No.: 14/384,870

(22) PCT Filed: Jan. 31, 2014

(86) PCT No.: PCT/US2014/014207
§ 371 (c)(1),
(2) Date: Sep. 12, 2014

(87) PCT Pub. No.: WO2015/116182
PCT Pub. Date: Aug. 6, 2015

(65) Prior Publication Data
US 2016/0253841 A1    Sep. 1, 2016

(51) Int. Cl.
*G06T 19/00*    (2011.01)
*G06F 3/00*    (2006.01)
(Continued)

(52) U.S. Cl.
CPC ............ *G06T 19/006* (2013.01); *G06F 3/005* (2013.01); *G06F 3/04842* (2013.01);
(Continued)

(58) Field of Classification Search
CPC .. G06F 3/0481; G06F 3/04817; G06F 9/4443; G06F 3/04847; G06F 11/3664;
(Continued)

(56) References Cited

U.S. PATENT DOCUMENTS

| 5,278,662 A | 1/1994 | Womach et al. |
| 6,672,961 B1 | 1/2004 | Uzun |

(Continued)

FOREIGN PATENT DOCUMENTS

| EP | 1453002 A2 | 9/2004 |
| GB | 2488237 A | 8/2012 |

(Continued)

OTHER PUBLICATIONS

"ARToolKit," accessed at https://web.archive.org/web/20131230032715/http://www.hitl.washington.edu/artoolkit/, accessed on Aug. 5, 2014, p. 1.

(Continued)

*Primary Examiner* — Todd Buttram

(57) ABSTRACT

Technologies are generally described for methods and systems effective to produce an evaluation image. In some examples, a processor may receive initial image data generated by light reflected from an object, that corresponds to a real object at a first instance of time. The processor may apply a first skin to modify pixels of features in the initial image data to produce intermediate data and apply a second skin to pixels of features in the intermediate data to produce augmented data. The skins may modify pixels in image data. The processor may receive evaluation image data, used to evaluate execution of the first or second skin, that corresponds to the real object at a second instance of time. The processor may apply the first skin to the evaluation image data to generate evaluation data different from the augmented data.

15 Claims, 8 Drawing Sheets

(51) Int. Cl.
*G06F 3/0484* (2013.01)
*G06T 19/20* (2011.01)
*G09G 5/02* (2006.01)

(52) U.S. Cl.
CPC .......... *G06F 3/04845* (2013.01); *G06T 19/20* (2013.01); *G09G 5/026* (2013.01); *G06T 2219/2024* (2013.01)

(58) Field of Classification Search
CPC ........ G06F 3/011; G06F 3/012; G06F 3/0304; G06T 19/00; G06T 17/00; G06T 19/006; H04N 5/272; A63F 13/10
See application file for complete search history.

(56) References Cited

U.S. PATENT DOCUMENTS

| | | |
|---|---|---|
| 7,626,569 B2 | 12/2009 | Lanier |
| 8,190,939 B2 | 5/2012 | Fields, Jr. et al. |
| 8,743,145 B1 | 6/2014 | Price |
| 9,380,270 B1 | 6/2016 | Worley, III et al. |
| 9,865,088 B2 | 1/2018 | Ur |
| 2004/0179037 A1* | 9/2004 | Blattner ............... G06T 13/40 715/751 |
| 2005/0026685 A1* | 2/2005 | Ruark ................ A63F 13/10 463/31 |
| 2005/0175101 A1* | 8/2005 | Honda ............... H04N 19/30 375/240.16 |
| 2005/0286799 A1 | 12/2005 | Huang et al. |
| 2007/0038944 A1* | 2/2007 | Carignano ............ G06T 15/20 715/757 |
| 2007/0260984 A1* | 11/2007 | Marks ................ A63F 13/06 715/706 |
| 2009/0220170 A1 | 9/2009 | Liu et al. |
| 2010/0302143 A1 | 12/2010 | Spivack |
| 2011/0018903 A1 | 1/2011 | Lapstun et al. |
| 2011/0055049 A1 | 3/2011 | Harper et al. |
| 2011/0134108 A1 | 6/2011 | Hertenstein |
| 2011/0138416 A1 | 6/2011 | Kang et al. |
| 2011/0141254 A1 | 6/2011 | Roebke et al. |
| 2011/0216089 A1 | 9/2011 | Leung |
| 2011/0221659 A1 | 9/2011 | King, III et al. |
| 2011/0258175 A1 | 10/2011 | Kim et al. |
| 2011/0279446 A1 | 11/2011 | Castro |
| 2011/0283223 A1 | 11/2011 | Vaittinen |
| 2012/0001939 A1 | 1/2012 | Sandberg |
| 2012/0019547 A1 | 1/2012 | Tjen et al. |
| 2012/0092370 A1 | 4/2012 | Oh et al. |
| 2012/0122529 A1 | 5/2012 | Lyons |
| 2012/0240077 A1 | 9/2012 | Vaitiinen et al. |
| 2012/0249741 A1 | 10/2012 | Maciocci et al. |
| 2012/0262485 A1 | 10/2012 | Raghoebardajal et al. |
| 2012/0327196 A1 | 12/2012 | Ohba et al. |
| 2013/0016123 A1* | 1/2013 | Skarulis ................ G09G 5/00 345/633 |
| 2013/0038633 A1 | 2/2013 | Maggiore |
| 2013/0044129 A1 | 2/2013 | Latta |
| 2013/0049976 A1 | 2/2013 | Maggiore |
| 2013/0057544 A1* | 3/2013 | Oh .................. G06Q 30/06 345/419 |
| 2013/0063487 A1 | 3/2013 | Spiegel et al. |
| 2013/0093790 A1 | 4/2013 | Jin |
| 2013/0106867 A1 | 5/2013 | Joo et al. |
| 2013/0106900 A1 | 5/2013 | Joo et al. |
| 2013/0128022 A1 | 5/2013 | Bose et al. |
| 2013/0147837 A1 | 6/2013 | Stroila |
| 2013/0293584 A1 | 11/2013 | Anderson |
| 2014/0015987 A1 | 1/2014 | Harple et al. |
| 2014/0173508 A1* | 6/2014 | Berry ................ G06F 3/04847 715/794 |
| 2014/0306982 A1 | 10/2014 | Ollivier |
| 2015/0084989 A1* | 3/2015 | Laughlin ............. G06T 19/20 345/633 |
| 2015/0097812 A1* | 4/2015 | Huang ............... G06F 3/0425 345/175 |
| 2015/0097862 A1 | 4/2015 | Reisner-Kollmann et al. |
| 2015/0123966 A1 | 5/2015 | Newman |
| 2016/0062456 A1 | 3/2016 | Wang et al. |
| 2016/0063671 A1 | 3/2016 | Piippo |

FOREIGN PATENT DOCUMENTS

| | | |
|---|---|---|
| JP | 2007216000 A | 8/2007 |
| KR | 20120070985 A | 7/2012 |
| WO | 2010024486 A1 | 3/2010 |
| WO | 2011146776 A1 | 11/2011 |
| WO | 2013023705 A1 | 2/2013 |
| WO | 2013049248 A2 | 4/2013 |

OTHER PUBLICATIONS

"Creator Program," accessed at https://web.archive.org/web/20130525200037/http://www.imvu.com/creators/about-_the_program.php, accessed on Aug. 5, 2014, pp. 1-2.

"Glass Platform Developer Guidelines," accessed at https://web.archive.org/web/20131109171046/https://developers.google.com/glass/guidelines, Last modified Aug. 12, 2013, pp. 1-2.

"Inventory From Second Life Wiki," accessed at https://web.archive.org/web/20130907075454/http://wiki.secondlife.com/wiki/Inventory, Mar. 19, 2012, pp. 1-4.

Kokkevis, V., "GPU Accelerated Compositing in Chrome," Accessed at http://web.archive.org/web/20131210233722/http://www.chromium.org/developers/design-documents/gpu-accelerated-compositing-in-chrome, Accessed at Aug. 5, 2014, pp. 9.

"Pipeline (software)," Wikipedia, accessed at http://web.archive.org/web/20130123092009/http://en.wikipedia.org/wiki/Pipeline_(software), last modified on Jan. 3, 2013, pp. 1-5.

"Second Life Market Place," accessed at https://web.archive.org/web/20131104081053/https://marketplace.secondlife.com/products/search?search%5Bcategory_id%5D=33, Accessed on Aug. 5, 2013, pp. 1-10.

Carmigniani, J. and Furht, B. "Augmented Reality: An Overview," Handbook of Augmented Reality, 2011, pp. 3-46, Springer Science + Business Media.

Cobzas, D., et al., "Editing Real World Scenes: Augmented Reality with Image-based Rendering," In Proceedings of IEEE, 2003, pp. 291-292.

Columbus, L., "Gartner's Mobile App Store Forecast Predicts $26B in Sales, 102B Downloads in 2013," posted on Sep. 21,2013, Accessed at http://www.forbes.com/sites/louiscolumbus/2013/09/21/gartners-mobile-app-store-forecast-predicts-26b-in-sales-102b-downloads-in-2013/?utm_campaign=techtwittersf&utm_source=twitter&utm_medium=social, Accessed on Aug. 5, 2014, pp. 6.

Gimeno, J. "An Advanced Authoring Tool for Augmented Reality Applications in Industry," In proceeding of: Actas de las XXIII Jornadas de Paralelismo, Sep. 21, 2012, pp. 6.

Huang, C., et al., "Directions for Peer-to-Peer based mobile pervasive augmented reality gaming," International Conference on Parallel and Distributed Systems, 2007, pp. 1-8, vol. 2.

Inger, Y., "REAL-time Image Blending for Augmented Reality on Mobile Phones," Jun. 2, 2011, pp. 1-16.

International Search Report and Written Opinion for International Application No. PCT/US2014/014201, dated Jun. 26, 2014, 10 pages.

International Search Report and Written Opinion for International Application No. PCT/US2014/014207, dated Jun. 25, 2014, 11 pages.

International search report and Written Opinion for international application No. PCT/US2014/014212, dated Jun. 23, 2014, 9 pages.

International Search Report and Written Opinion for International Application No. PCT/US2014/014223, dated Jun. 26, 2014, 10 pages.

Law, A., "Photoshop Quick Tip: Finding Layers Quickly," accessed at https://web.archive.org/web/20131007002057/http://www.gomediazine.com/tutorials/photoshop-quick-tip-finding-layers-quickly/, Gomedia, Jul. 27, 2009, pp. 1-4.

(56) References Cited

OTHER PUBLICATIONS

Leetaru, K. H., "ShadowLight: an immersive environment for rapid prototyping and design," Proceedings of the SPIE, 2005, pp. 606-615, vol. 5664.

Lepetit, V., et al., "Real-Time Augmented Face," In Proc. International Symposium on Mixed and Augmented Reality, 2003, pp. 1-2.

Patterson, S., "Photoshop Layers Essential Power Shortcuts," accessed at https://web.archive.org/web/20131118090620/http://www.photoshopessentials.com/basics/layer-shortcuts/, accessed on Aug. 5, 2014, pp. 1-12.

Philg, "Legal and social issues due to Google Glass?," accessed at https://web.archive.org/web/20140615133037/http://blogs.law.harvard.edu/philg/2013/05/31/legal-and-social-issues-due-to-google-glass/, May 31, 2013, pp. 1-4.

Renukdas, P. et al., "Markerless Augmented Reality Android App for Interior Decoration," International Journal of Engineering Research & Technology (IJERT), 2013, pp. 1367-1373, vol. 2 Issue 4.

Rosten, E., et al., "Real-time Video Annotations for Augmented Reality," Advances in Visual Computing, Lecture Notes in Computer Science, 2005, pp. 294-302, vol. 3804.

Stankovic, S. and Rakkolainen, I., "Augmented Reality," SGN-5406 Virtual Reality, 2012, pp. 1-71.

Tennant, D., "How Augmented Reality Will Help Close the Skills Gap," accessed at http://web.archive.org/web/20130613042449/http://www.itbusinessedge.com/blogs/from-under-the-rug/how-augmented-reality-will-help-close-the-skills-gap.html, IT Business Edge, Jan. 9, 2013, pp. 1-8.

Wiltzuis, T., "Accelerated Rendering in Chrome," accessed at https://web.archive.org/web/20131129024711/http://www.html5rocks.com/en/tutorials/speed/layers, Mar. 11, 2013, pp. 1-9.

Extended European Search Report for European Patent Application No. 14880509 dated Sep. 22, 2017, pp. 9 .

Extended European Search Report for European Patent Application No. 14880818 dated Aug. 28, 2017, pp. 6.

Shapira, L., et al., "Layout Design for Augmented Reality Applications," Microsoft, accessed at https://www.microsoft.com/en-us/research/publication/layout-design-for-augmented-reality-applications/, Jan. 1, 2014, pp. 3.

Extended European Search Report for European Patent Application No. 14881088 dated Jun. 6, 2017, pp. 10.

Extended European Search Report for European Patent Application No. 14881231 dated May 26, 2017, pp. 9.

* cited by examiner

100

Fig. 7

700 A computer program product.
702 A signal bearing medium.

704
At least one of
One or more instructions for producing an evaluation image; or
One or more instructions for receiving initial image data at a first instance of time, wherein the initial image data corresponds to a real object; or
One or more instructions for applying a first skin to the initial image data to produce intermediate data; or
One or more instructions for applying a second skin to the intermediate data to produce augmented data; or
One or more instructions for receiving evaluation image data at a second instance of time, wherein the evaluation image data corresponds to the real object; or
One or more instructions for receiving an input that includes an indication of the first skin; or
One or more instructions for, in response to the input, applying the first skin to the evaluation image data to generate evaluation data, the evaluation data being different from the augmented data; or
One or more instructions for rendering an evaluation image based on the evaluation data.

706 A computer readable medium

708 A recordable medium

710 A communications medium

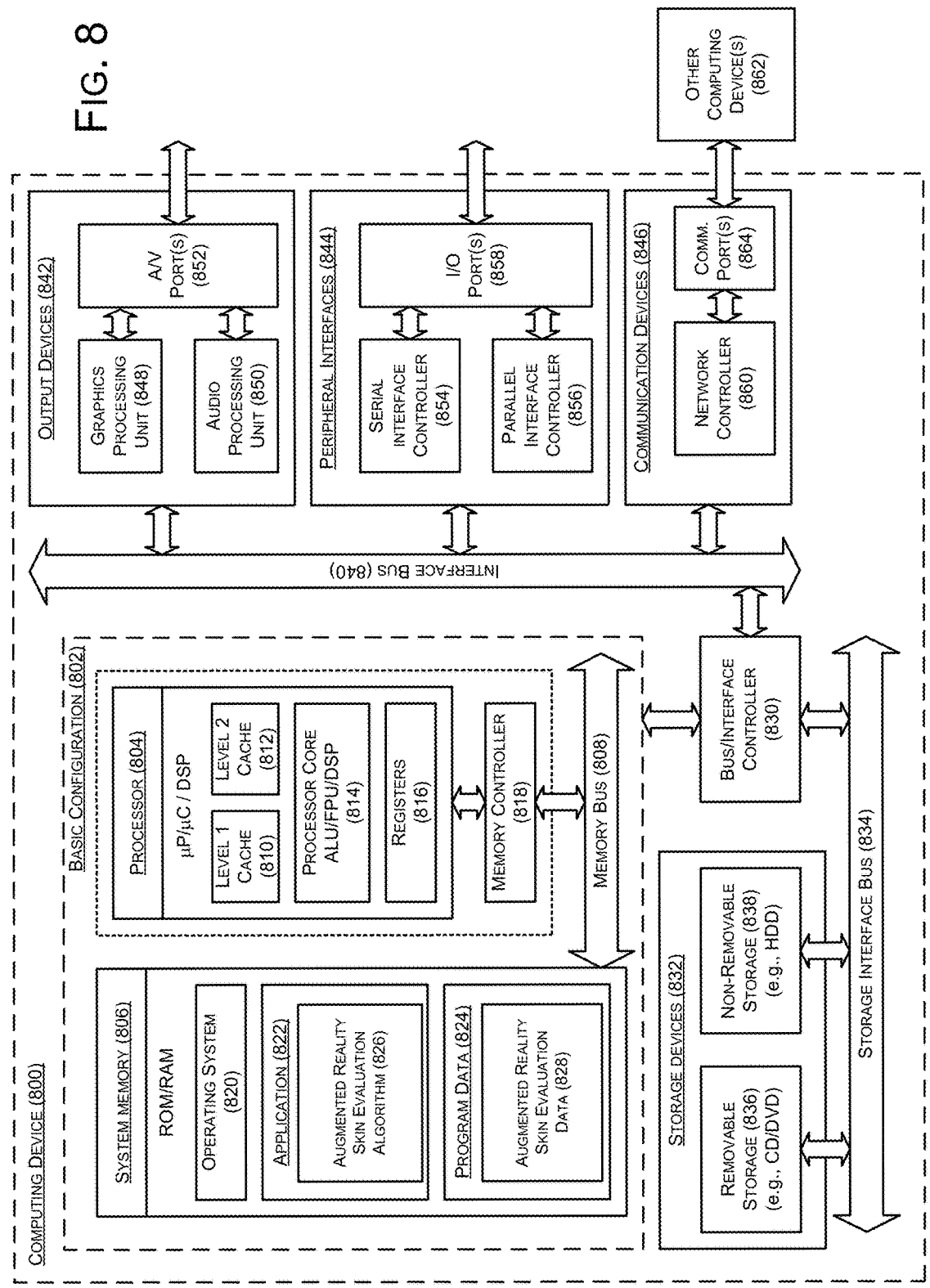

AUGMENTED REALITY SKIN EVALUATION

CROSS-REFERENCE TO RELATED APPLICATIONS

This Patent application is a U.S. National Stage filing under 35 U.S.C. § 371 of International Application No. PCT/US2014/014207, filed on Jan. 31, 2014, which is incorporated herein by reference in its entirety. This application is also related to U.S. patent application Ser. No. 14/384,825, entitled "AUGMENTED REALITY SKIN MANAGER", filed on Sep. 12, 2014, U.S. patent application Ser. No. 14/384,887, entitled "SUBJECT SELECTED AUGMENTED REALITY SKIN", filed on Sep. 12, 2014, and U.S. patent application Ser. No. 14/384,917, entitled "EVALUATION OF AUGMENTED REALITY SKINS", filed on Sep. 12, 2014, now U.S. Pat. No. 9,865,088, each of which is incorporated herein by reference in its entirety for any and all purposes.

BACKGROUND

Unless otherwise indicated herein, the materials described in this section are not prior art to the claims in this application and are not admitted to be prior art by inclusion in this section.

Augmented reality may use the real world as a background and add one or more layers of augmented information. A sensor may capture real image data relating to the real world. A processor may identify a reference point in the real image data. The processor may execute instructions to apply augmented reality data to the real image data based on the reference point. A user of an augmented reality device may control applications of augmented reality data to real image data.

SUMMARY

In some examples, methods for producing an evaluation image are generally described. The methods may include receiving initial image data at a first instance of time. The initial image data may correspond to a real object. The methods may also include applying a first skin to the initial image data to produce intermediate data. The methods may also include applying a second skin to the intermediate data to produce augmented data. The methods may also include receiving evaluation image data at a second instance of time. The evaluation image data may correspond to the real object. The methods may also include receiving an input that includes an indication of the first skin. The methods may also include, in response to the input, applying the first skin to the evaluation image data to generate evaluation data. The evaluation data may be different from the augmented data. The methods may also include rendering an evaluation image based on the evaluation data.

In some examples, systems effective to produce an evaluation image are generally described. The systems may include a memory, a camera, an augmented reality display, and a processor. The processor may be configured to be in communication with the memory, the camera, and the augmented reality display. The camera may be configured to capture initial image data at a first instance of time. The initial image data may correspond to a real object. The processor may be configured to store the initial image data in the memory. The processor may also be configured to apply a first skin to the initial image data to produce intermediate data. The processor may also be configured to apply a second skin to the intermediate data to produce augmented data. The processor may also be configured to render an augmented image based on the augmented data on the augmented reality display. The camera may be configured to capture evaluation image data at a second instance of time. The evaluation image data may correspond to the real object. The processor may also be configured to receive an input that includes an indication of the first skin. The processor may also be configured to, in response to the input, apply the first skin to the evaluation image data to generate evaluation data. The evaluation data may be different from the augmented data. The processor may also be configured to render an evaluation image based on the evaluation data on the augmented reality display.

In some examples, methods for producing an evaluation image are generally described. The methods may include identifying augmented reality instructions effective to apply a first skin to an initial image data to produce intermediate data. The initial image data may correspond to a real object. The methods may also include identifying augmented reality instructions effective to apply a second skin to the intermediate data to produce augmented data. The methods may also include receiving evaluation image data. The evaluation image data may correspond to the real object. The methods may also include receiving an input that includes an indication of the first skin. The methods may also include, in response to the input, applying the first skin to the evaluation image data to generate evaluation data. The evaluation data may be different from the augmented data. The methods may also include rendering an evaluation image based on the evaluation data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 illustrates an example computer program product that can be utilized to implement augmented reality skin evaluation; and FIG. 8 is a block diagram illustrating an example computing device that is arranged to implement augmented reality skin evaluation; all arranged according to at least some embodiments described herein.

DETAILED DESCRIPTION

Figure 1:
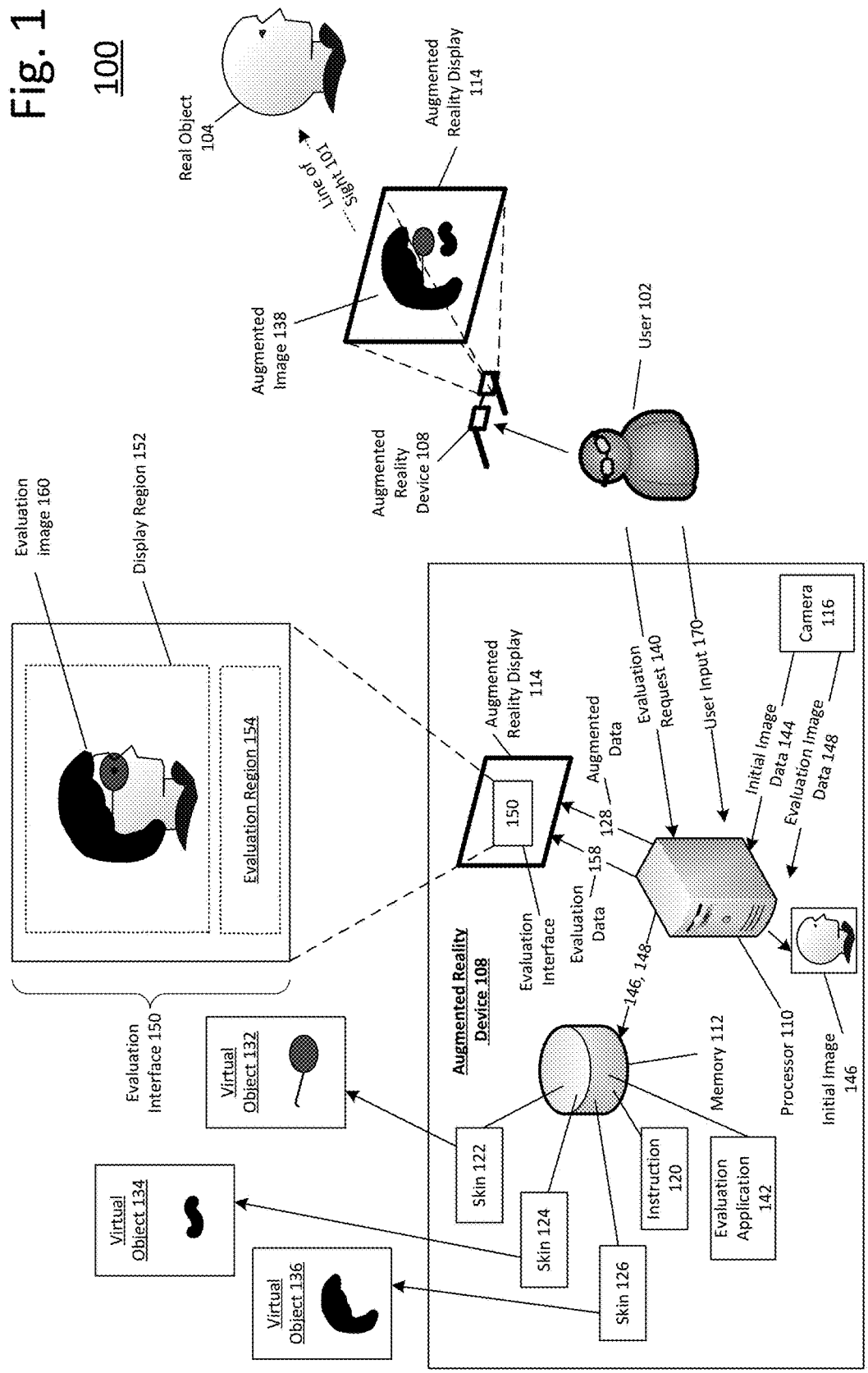
FIG. 1 illustrates an example system that can be utilized to implement augmented reality skin evaluation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to augmented reality skin evaluation.

Briefly stated, technologies are generally described for methods and systems effective to produce an evaluation image that may be helpful in facilitating review of execution of an augmented reality skin. In some examples, a processor may receive initial image data generated by light reflected from an object. The initial image data may correspond to a real object at a first instance of time. The processor may apply a first skin to modify pixels of features in the initial image data to produce intermediate data and apply a second skin to pixels of features in the intermediate data to produce augmented data. The skins may modify pixels in image data. The processor may receive evaluation image data which may be used to evaluate execution of the first or second skin. The evaluation image data may correspond to the real object at a second instance of time. The processor may apply the first skin, which may be less than all of the skins available in a memory, to the evaluation image data to generate evaluation data different from the augmented data. The evaluation data may be different from the augmented data because the second skin was not applied. A user can review execution of some, but not all, of augmented reality skins so that the user can evaluate execution of each skin.

FIG. 1 illustrates an example system 100 that can be utilized to implement augmented reality skin evaluation, arranged in accordance with at least some embodiments described herein. System 100 may include an augmented reality device 108. Augmented reality device 108 may include a processor 110, a memory 112, an augmented reality display 114, and/or a camera 116. Augmented reality device 108 may be, for example, a mobile phone, tablet computer, and/or a wearable device such as augmented reality glasses. Processor 110 may be configured to be in communication with memory 112, augmented reality display 114, and/or camera 116.

Camera 116 may be configured to capture light reflected from real object 104 at an instance in time and may generate initial image data 144 in response. Initial image data 144, when rendered on augmented reality display 114, may produce an initial image 146. Processor 110 may process initial image data 144, such as by applying skins (discussed below) to produce augmented data 128. Augmented data 128, when rendered on augmented reality display 114, may produce an augmented image 138 that may overlay real object 104. In another example, camera 116 may generate evaluation image data 148. Evaluation image data 148, when rendered on augmented reality display 114, may produce an evaluation image 160.

Memory 112 may store an evaluation application 142 and/or one or more skins 122, 124, 126. Evaluation application 142 may include instructions to facilitate evaluation of one or more skins among skins 122, 124, 126 as is described in more detail below. A skin may be, for example, instructions and/or data applied to initial image data 144 to produce augmented data 128. Augmented data 128 may be a result of execution of skins 122, 124, 126 by processor 110. Execution of skins 122, 124, 126 by processor 110 may include applying skins 122, 124, 126 to initial image data 144 to generate intermediate data and eventually augmented data 128. Augmented data 128, when rendered on augmented reality display 114, may produce augmented image 138 overlaid on real object 104. Prior to an application of skins 122, 124, 126 to initial image data 144, processor 110 may store initial image data 144 in memory 112.

Data in skins 122, 124, 126 may be image data, such as pixel values, that corresponds to virtual objects 132, 134, 136, respectively. Instructions in skins 122, 124, 126 may be procedures effective to identify a reference point in image data 146, or in intermediate data (explained below), and/or replace pixels associated with the reference point with respective skin data. In an example, a skin may identify lips (reference point) in image data, associate a portion of the image data with the reference point, and replace pixels associated with the lips (reference point) with a mustache (skin data). Memory 112 may further store an instruction 120. Instruction 120 may include a processing sequence that corresponds to skins 122, 124, 126. For example, instruction 120 may instruct processor 110 to first apply skin 122 to initial image data 144 to produce a first intermediate data; then apply skin 126 to the first intermediate data to produce second intermediate data; then apply skin 124 to the second intermediate data to produce augmented data 128 or evaluation image data 148.

A user 102 may view real object 104 along line of sight 101 using augmented reality device 108 such as by wearing augmented reality device 108 or positioning augmented reality device 108 between an eye of user 102 and real object 104. User 102 may see augmented image 138 on augmented reality display 114 overlaying real object 104 along line of sight 101.

When user 102 is viewing real object 104 using augmented reality device 108, user 102 may identify a feature in augmented image 138 and may wish to identify particular skins relating to the feature. Identification of the particular skins relating to the feature may allow the user to identify skins that are executing improperly. For example, the feature may be an undesired quality or attribute of augmented image 138. An example of an undesired feature or attribute may be too much virtual lipstick overlaying an image of a person. To identify the particular feature or attribute, user 102 may send evaluation request 140 to processor 110, such as by speech input or by using an interface of augmented reality device 108. In response to receiving evaluation request 140, processor 110 may execute evaluation application 142 in memory 112. During execution of evaluation application 142, processor 110 may generate an evaluation interface 150 on augmented reality display 114.

In executing evaluation application 142, and in response to a user input 170, processor 110 may command camera 116 to capture light reflected from real object 104 at an instant in time, and to generate evaluation image data 148 that corresponds to real object 104. Processor 110 may receive evaluation image data 148 from camera 116 and may store evaluation image data 148 in memory 112. Processor 110 may apply one or more of skins 122, 124, 126 to evaluation image data 148. Processor 110 may apply skins 122, 124, 126 based on the processing sequence defined in instruction 120 to produce evaluation data 158. Evaluation data 158, when rendered on augmented reality display 114, may produce an evaluation image 160 in evaluation interface 150. Evaluation image 160 may represent a result of an application of one or more skins, but perhaps less than a total number of skins stored in memory 112, on evaluation image data 148.

As discussed in more detail below, in another example, user 102 may identify an area of augmented image 138 with an undesired feature, quality or attribute. User 102 may send a user input to processor 110 identifying the area. Processor 110 may identify the area and identify particular skins with reference points in the area and so those skins may be causing the undesired feature, quality or attribute. Processor 110 may apply the particular skins to evaluation image data 148 to generate evaluation data 158. Processor 110 may produce evaluation image 160 by rendering evaluation data 158 on augmented reality display 114. In response to processor 110 producing evaluation image 160, user 102 may review evaluation image 160, using evaluation interface 150, to identify the particular skins.

If all skins are applied, evaluation image 160, when viewed on augmented reality display 114, may resemble augmented image 138 overlapping real object 104—as evaluation image 160 includes initial image data 144 that corresponds to real object 104 and applied skins Evaluation interface 150 may include a display region 152 and an evaluation region 154. Display region 152 may display evaluation image 160. Evaluation region 154 may include components to facilitate evaluation by user 102 of one or more skins based on evaluation image 160 displayed in display region 152 as is described in more detail below.

Figure 2:
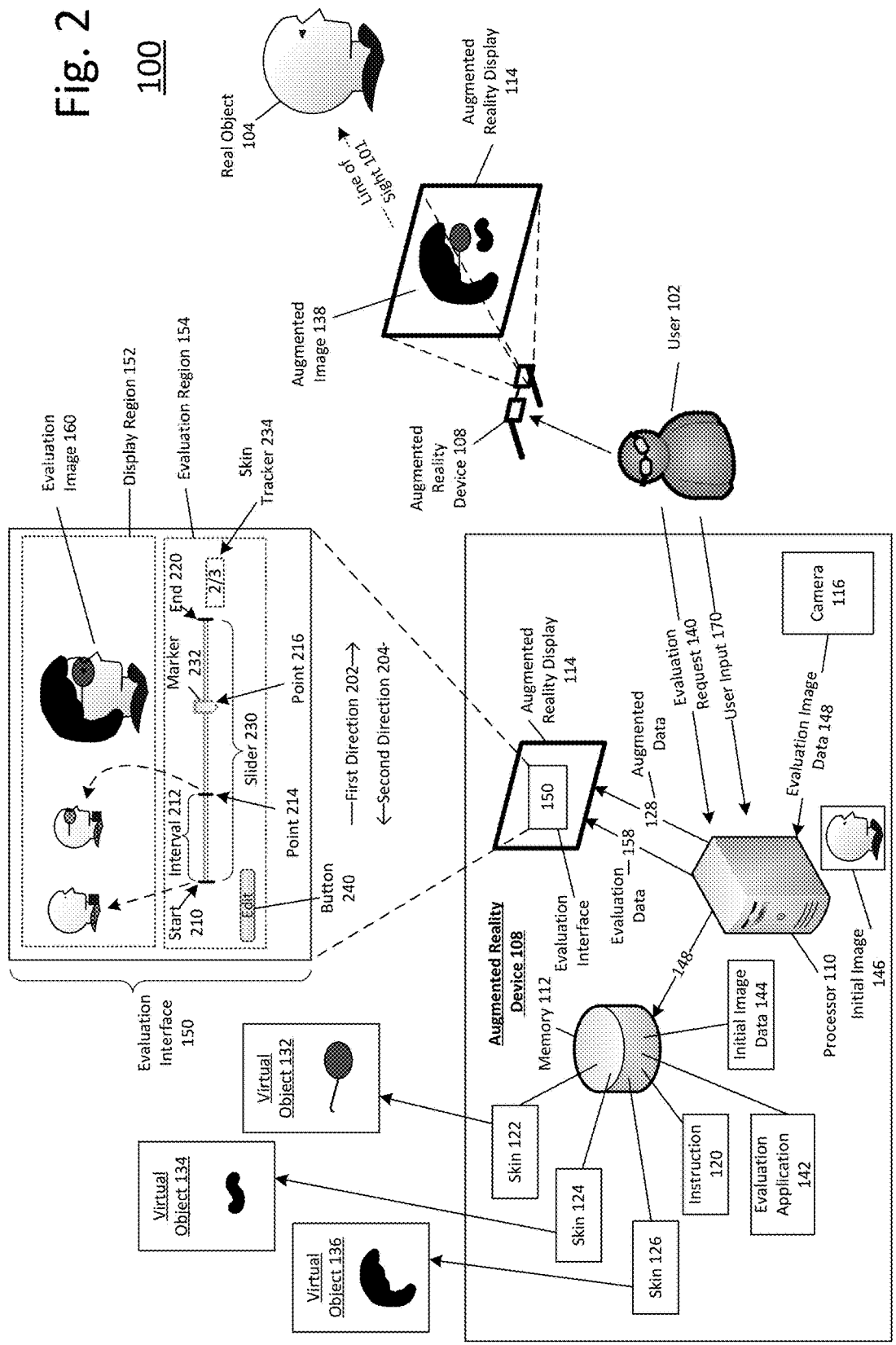
FIG. 2 illustrates the example system of FIG. 1 with additional detail relating to an evaluation interface.

FIG. 2 illustrates the example system 100 of FIG. 1 with additional detail relating to an evaluation interface, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

As discussed above, processor 110 may generate evaluation interface 150. Evaluation interface 150 may include display region 152 and evaluation region 154. Display region 152 may display evaluation image 160 produced by processor 110. Evaluation region 154 may include a slider 230, a skin tracker 234, and one or more buttons such as button 240. An example implementation of augmented reality skin evaluation may be based on the operations of the components, such as slider 230, skin tracker 234, and button 240, in evaluation region 154 of evaluation interface 150.

Slider 230 may include points such as a start 210 and an end 220. A number of points may be defined between start 210 and end 220 based on the total number of skins stored in memory 112. In the example, memory 112 may store a total of three skins (skins 122, 124, 126). Evaluation application 142 may include instructions to instruct processor to define two points 214, 216 on slider 230 between start 210 and end 220. The number of points between start 210 and end 220 may change in response to addition and/or removal of skins to and/or from memory 112. Start 210, end 220, and points 214, 216 may each be separated by an interval 212. A size of interval 212 may change based on the number of skins stored in memory 112. In some examples, start 210, end 220, and/or points 214, 216 may be visible to users when evaluation interface 150 is displayed on augmented reality display 114. In some examples, start 210, end 220, and/or points 214, 216 may not be visible to users when evaluation interface 150 is displayed on augmented reality display 114.

A marker 232 may be moved along slider 230 in a first direction 202 or a second direction 204 between start 210 and end 220. In some examples, augmented reality device 108 may include a user interface such as buttons to move marker 232 along slider 230. In some examples, user 102 may provide speech input to instruct marker 232 to move along slider 230. Marker 232 may be moved to start 210, end 220, point 214, or point 216 on slider 230 based on user input 170.

Movement and/or placement of marker 232 may be effective to create a skin number evaluation signal. Processor 110 may receive and process the skin number evaluation signal and apply a number of skins to evaluation image data 158 corresponding to the skin number evaluation signal. For example, movement of marker 232 in first direction 202 may increase the number of skins to be applied by processor 110 to evaluation image data 148. Movement of marker 232 in second direction 204 may decrease the number of skins to be applied by processor 110 to evaluation image data 158. Evaluation image 160 may also change in response to the change of the number of skins applied to evaluation image data 148. When processor 110 outputs evaluation interface 150, marker 232 may be moved to a default point, such as start 210, on slider 230.

In an example, instruction 120 in memory 112 may include a processing sequence of applying skin 122, then skin 126, then skin 124 to initial image data 144. User 102 may have identified an undesirable feature in augmented image 138 and may wish to evaluate an application of skins 122, 126, and 124. User 102 may send evaluation request 140 to processor 110 requesting evaluation of a skin. In response to receiving evaluation request 140, processor 110 may command camera 116 to capture light reflected from real object 104 and to generate evaluation image data 148. Also in response to receiving evaluation request 140, processor 110 may render evaluation image 160 based on evaluation image data 148 and may output evaluation interface 150 on augmented reality display 114. Initially, marker 232 may be positioned at start 210 and evaluation image 160 may be an image with no skin applied. In some examples, evaluation image 160 may resemble initial image 146 when marker 232 is positioned at start 210.

User 102 may move marker 232 in first direction 202 or second direction 204 to create user input 170. If user 102 stops moving marker 232 at point 214, user input 170 may include an indication of point 214. Processor 110 may receive user input 170. Processor 110 may analyze user input 170 and may identify the indication of point 214. In response to the analysis, processor 110 may apply skin 122 to evaluation image data 148 to generate evaluation data 158. Evaluation data 158 may be rendered on augmented reality display 114 to produce evaluation image 160. Evaluation image 160 may be displayed in display region 152 and may be an image that resembles virtual object 132 (eye patch) overlaying real object 104 (as depicted by the dashed arrow from point 214). If user 102 stops moving marker 232 at point 216, user input 170 may include an indication of point 216. Processor 110 may receive user input 170 and may analyze user input 170 and may identify the indication of point 216. In response to the analysis, processor 110 may apply skins 122, 126 to evaluation image data 148 to generate evaluation data 158. Evaluation image 160 may be displayed in display region 152 and may be an image that resembles virtual objects 132, 136 (eye patch and hair) overlaying real object 104.

In an example, user 102 may continue to move marker 232 in first direction 202 to end 220. User 102 may see an evaluation image 160 with skins 122, 124, 126 overlaying real object 104. User 102 may move marker 232 in second direction 204 to point 214 to evaluate skins 122, 126.

When marker 232 is at point 216, evaluation image 160 may be used to evaluate the application of skins 122, 126. User 102 may select button 240 to begin an evaluation process on skins 122, 126. An example evaluation process may be repositioning, resizing, or removing one or more skins among skins 122, 126. In some examples, user 102 may indicate conditions or situations when a particular skin should be applied. In some examples, user 102 may alter some attributes of a skin in order to affect a modified rendering of an evaluation image.

A value of skin tracker 234 may be modified based on a position of marker 232 and may be effective to indicate a number of skins applied to evaluation image data 158 in the processing sequence defined by instruction 120. For example, skin tracker 234 may be a value ⅓ when marker 232 is moved to point 214, and may be a value ⅔ (as depicted) when indicator is moved to point 216.

Figure 3:
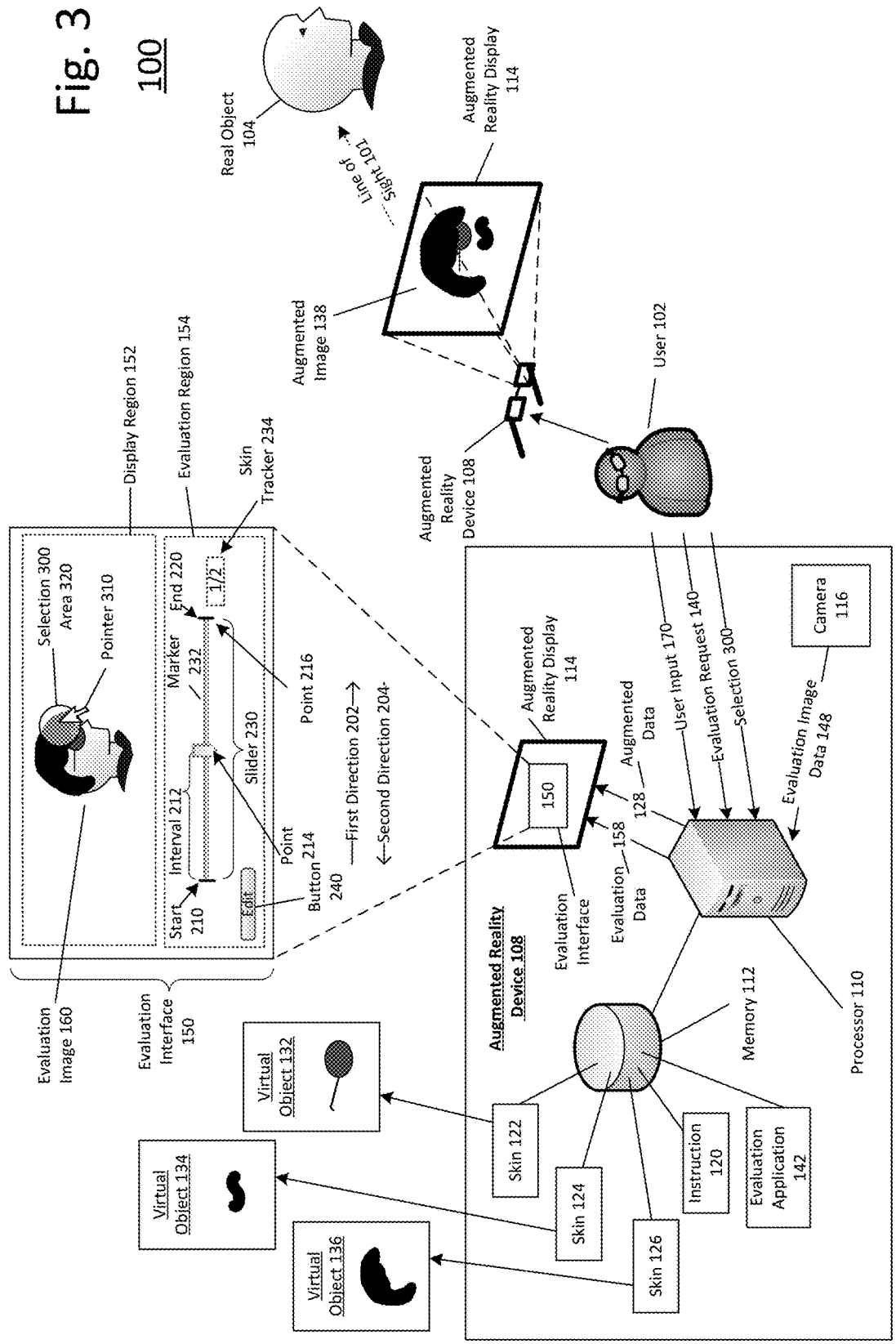
FIG. 3 illustrates the example system of FIG. 1 with additional detail relating to a selection area in an evaluation interface.

FIG. 3 illustrates the example system of FIGS. 1 and 2 with additional detail relating to a selection area in an evaluation interface, arranged in accordance with at least some embodiments described herein. FIG. 3 is substantially similar to system 100 of FIGS. 1 and 2, with additional details. Those components in FIG. 3 that are labeled identically to components of FIGS. 1 and 2 will not be described again for the purposes of clarity.

An example implementation of augmented reality skin evaluation system 100 may be based on a selection of an area in evaluation image 160. Evaluation interface 150 may further display a pointer 310. Pointer 310 may be movable within the boundaries of evaluation interface 150. In some examples, augmented reality device 108 may include a user interface, such as buttons, for user 102 to control pointer 310. In some examples, user 102 may provide speech input to control pointer 310. User 102 may use pointer 310 to create a selection 300. Selection 300 may include data that corresponds to an area of evaluation image 160.

In the example depicted, user 102 may send evaluation request 140 to processor 110. In response to receiving evaluation request 140, processor 110 may command camera 116 to capture light reflected from real object 104 and to generate evaluation image data 148. Also in response to receiving evaluation request 140, processor 110 may render evaluation image 160 based on evaluation image data 148 and may output evaluation interface 150 on augmented reality display 114. Evaluation image 160 may include application of all skins in memory 112. Initially, pointer 310 may be in an arbitrary position within the boundaries of evaluation interface 150. In some examples, evaluation region 154 of evaluation interface 150 may not be visible to user 102 initially. Evaluation image 160 may be an image with skins 122, 124, 126 applied and marker 232 may be positioned at end 220 initially.

User 102 may move pointer 310 to identify an area 320 in evaluation image 160. User 102 may create selection 300 that identifies area 320 such by pointing or drawing a shape around area 320. Processor 110 may receive selection 300 and may analyze memory 112 to identify skins with references points in area 320. As discussed herein, skins may be configured to identify a reference point in image data and replace pixels associated with the reference point with skin data. In the example depicted, processor 110 may identify skins 122, 126 as having reference points in area 320. Processor 110 may update evaluation interface 150 to include evaluating image 160 (as shown) and evaluation region 154 to facilitate review of skins 122 and 126. Skin tracker 234, slider 230, start 210 and end 220 may be updated to reflect review and navigation of skins 122 and 126 and not other skins in memory 110. Processor 110 may output evaluation interface 150 on augmented reality display 114. Initially, marker 232 may be positioned at start 210. User 102 may move marker 232 in first direction 202 or second direction 204 to create user input 170.

User 102 may move marker 232 in first direction 202 to point 214. When marker 232 is stopped on point 214, user input 170 may include an indication of point 214. Processor 110 may receive user input 170 and may apply skin 122 to evaluation image data 148 to generate evaluation data 158. Evaluation data 158 may be rendered on augmented reality display 114 to produce evaluation image 160. Evaluation image 160 may be displayed in display region 152 and may be an image that resembles virtual object 132 (eye patch) overlaying real object 104.

User 102 may continue to move marker 232 is first direction 202 to point 216 which is now the same as end 220. Processor 110 may receive user input 170 and may apply skins 122, 126 to evaluation image data 148 to generate evaluation data 158. Evaluation image 160 may be displayed in display region 152 and may be an image that resembles virtual objects 132, 136 (eye patch and hair) overlaying real object 104. User 102 may determine that skin 126 includes the undesired feature and may command processor 110, such as by selection of button 240, for further processing such as debugging, reapplying skin 126, or manipulating virtual object 136 using evaluation interface 150.

In some examples, user 102 may request processor 110 to decrease a size of area 320 in order to narrow the number of skins to be evaluated. In some examples, area 320 may be visible to user 102 on evaluation interface 150. In some examples, area 320 may not be visible to user 102 on evaluation interface 150.

Figure 4:
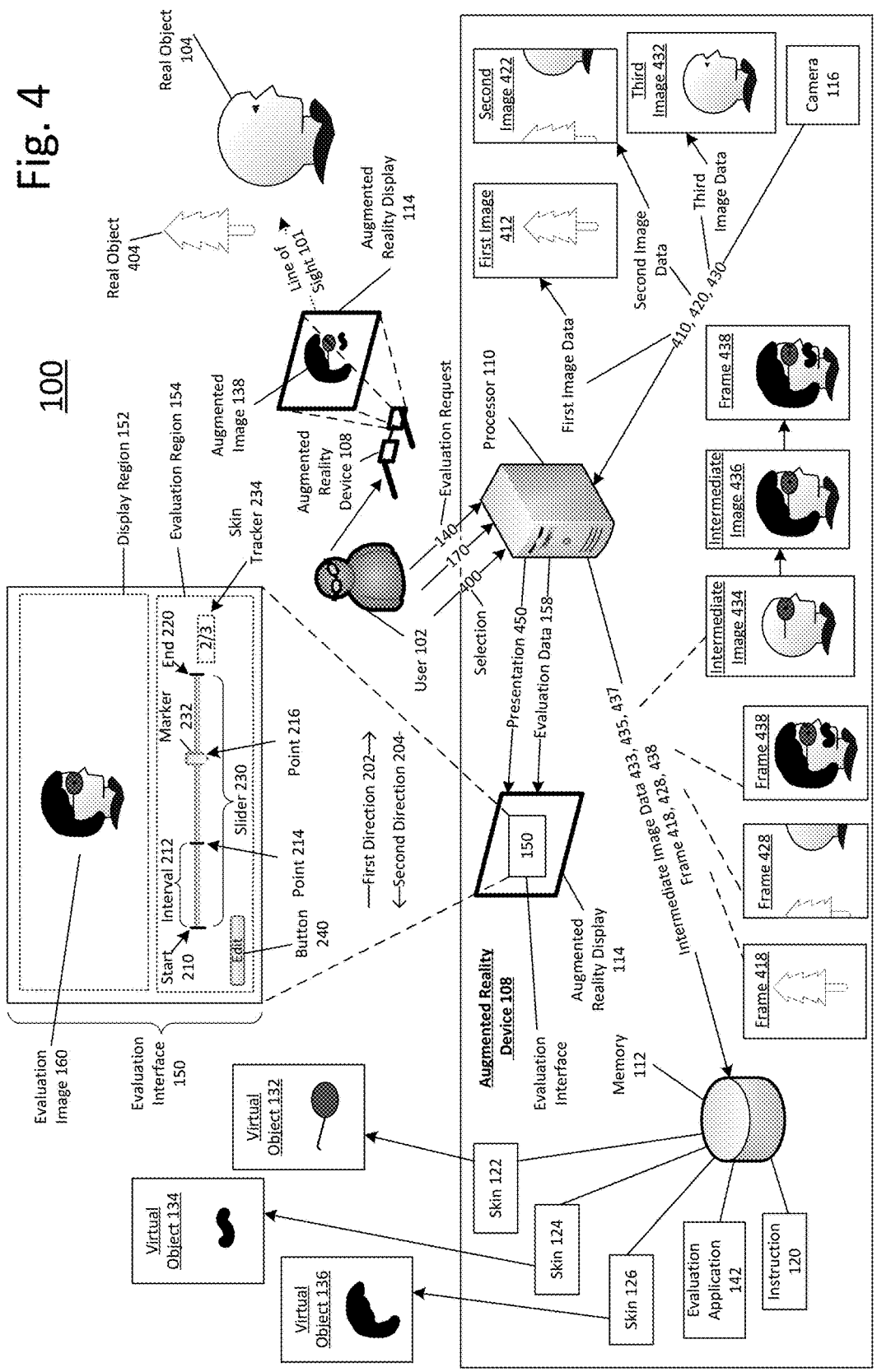
FIG. 4 illustrates the example system of FIG. 1 with additional detail relating to an example implementation where intermediate images are stored in a memory.

FIG. 4 illustrates the example system of FIGS. 1, 2 and 3 with additional detail relating to an example implementation where intermediate images are stored in a memory, arranged in accordance with at least some embodiments described herein. FIG. 4 is substantially similar to system 100 of FIGS. 1, 2 and 3 with additional details. Those components in FIG. 4 that are labeled identically to components of FIGS. 1, 2 and 3 will not be described again for the purposes of clarity.

In another example, as discussed in more detail below, processor 110 may store intermediate images or differences between intermediate images produced by application of skins. These intermediate images, or differences, may be reviewed by a user to identify undesired features or attributes in a skin. The intermediate images may be stored for a period of time, for example a minute, and then new intermediate images or differences may overwrite old intermediate images. Processor 110 may receive image data from camera 116. Processor 110 may apply a first skin to the received image data to generate a first intermediate image data. Processor 110 may apply a second skin to the first intermediate image data to generate a second intermediate image data. Processor 110 may then continue to apply subsequent skins to prior intermediate image data until a last skin of the processing sequence in instruction 120 is applied to produce a frame of augmented data. The augmented data may be rendered to produce a frame of an augmented image. Processor 110 may store each generated intermediate image data, or differences between intermediate data, and frame of augmented data in memory 112. User 102 may navigate through frames stored in memory 112 and may select a frame to evaluate. Upon selection of a frame, user 102 may navigate through intermediate images or differences relating to the selected frame to evaluate a skin of interest.

In the example depicted, a real object 404 may be adjacent to real object 104. User 102 may view real objects 104, 404 when using augmented reality device 108. Camera 116 of augmented reality device 108 may be configured to capture light reflected from real objects 104, 404 and may generate respective image data. For example, camera 116 may be configured to generate sixty pieces of image data per second. Processor 110 may be configured to retrieve particular image data generated from camera 116. For example, processor 110 may be configured to retrieve one piece of image data out of every ten pieces of image data generated by camera 116, such as the first, eleventh, twenty-first piece, etc. In some examples, user 102 may modify an activation rate of camera 116 and may modify the rate in which processor 110 retrieves image data from camera 116.

In the example, user 102 may be using augmented reality device 108 to view real object 404 along line of sight 101. Camera 116, at a first instance in time, may generate first image data 410. First image data 410, when rendered such as on augmented reality display 114, may produce first image 412. Processor 110 may retrieve first image data 410 from camera 116. Processor 110 may analyze the processing sequence in instruction 120 and may retrieve skin 122 from memory 112. Processor 110 may determine an absence of reference points associated with skin 122 in first image data 410. Processor 110 may continue to analyze the processing sequence in instruction 120 and retrieve skins 126, 124 and attempt to apply skins 126, 124 to first image data 410. Processor 110 may determine that no skin stored in memory 112 may be applied to first image data 410. In some examples, in response to the determination that no skin may be applied to first image data 410, processor 110 may generate a frame 418 that corresponds to first image data 410. Processor 110 may store frame 418 in memory 112. In some examples, in response to the determination that no skin may be applied to first image data 410, processor 110 may continue to process subsequent image data instead of generating and storing frame 418.

In the example, after a time period, line of sight 101 may be directed at a position between real object 404 and real object 104. Camera 116 may generate second image data 420. Processor 110 may retrieve second image data from camera 116. Second image data 420, when rendered such as on augmented reality display 114, may produce second image 422. Processor 110 may analyze the processing sequence in instruction 120 and may retrieve skin 122 from memory 112. Processor 110 may determine an absence of reference points associated with skin 122 in second image data 420. Processor 110 may continue to analyze the processing sequence in instruction 120 and retrieve skins 126, 124 and attempt to apply skins 126, 124 to second image data 430. Processor 110 may determine that no skin stored in memory 112 may be applied to second image data 420. In some examples, in response the determination that no skin may be applied to second image data 420, processor 110 may generate a frame 428 that corresponds to second image data 420. Processor 110 may store frame 428 in memory 112. In some examples, in response to the determination that no skin may be applied to second image data 420, processor 110 may continue to process a subsequent image data instead of generating and storing frame 428.

After another time period has elapsed, line of sight 101 may be directed to real object 104. Camera 116 may generate third image data 430. Processor 110 may retrieve third image data 430 from camera 116. Third image data 430, when rendered on augmented reality display 114, may produce third image 432. Processor 110 may analyze the processing sequence in instruction 120 and may retrieve skin 122 from memory 112. Processor 110 may identify a first reference point (e.g., an eye of real object 104) in third image data 430. Processor 110 may apply skin 122 to third image data 430 and may generate intermediate image data 433 in response. Intermediate image data 433, when rendered on augmented reality display 114, may produce an intermediate image 434. Processor 110 may store intermediate image data 433 in memory 112.

Processor 110 may analyze the processing sequence in instruction 120 and may retrieve skin 126 from memory 112. Processor 110 may identify a second reference point (e.g., a forehead of real object 104) in intermediate image data 433. Processor 110 may apply skin 126 to intermediate image data 433 and may generate intermediate image data 435 in response. Intermediate image data 435, when rendered on augmented reality display 114, may produce an intermediate image 436. Processor 110 may store intermediate image data 435 in memory 112.

Similarly, processor 110 may analyze the processing sequence in instruction 120 and may retrieve skin 124 from memory 112. Processor 110 may identify a third reference point (e.g., a mouth of real object 104) in intermediate image data 435. Processor 110 may apply skin 124 to intermediate image data 435 and may generate intermediate image data 437 in response. Processor 110 may determine that skin 124 is a last skin in the processing sequence of instruction 120. Intermediate image data 437, when rendered on augmented reality display 114, may produce frame 438. Processor 110 may store intermediate image data 437 in memory 112. Processor 110 need not generate image data for skins that have no effect on third image data 430.

In the example, user 102 may wish to evaluate a particular frame and/or skin shown on augmented reality display 114. User 102 may send evaluation request 140 to processor 110. In response to receiving evaluation request 140, processor 110 may output a presentation 450 to augmented reality display 114. In some examples, presentation 450 may be a video including frames 418, 428, 438. User 102 may view presentation 450 on augmented reality display 114. In some examples, user 102 may navigate among frames 418, 428, 428 when viewing presentation 450 such as by using a video playback interface displayed on augmented reality display 114. A length of presentation 450 may be modified based on evaluation request 140. For example, user 102 may request to evaluate frames in the past five seconds, ten seconds, or one minute, etc.

When user 102 is viewing presentation 450, user 102 may wish to evaluate a particular frame in presentation 450, such as frame 438. User 102 may create a selection 400 such as by selecting frame 438 in presentation 450. Selection 400 may include an indication of frame 438. Processor 110 may receive selection 400 from user 102. In response to receiving selection 400, processor 110 may identify the indication of frame 438 in selection 400 and may generate evaluation data 158.

In the example, user 102 may use evaluation interface 150 to evaluate frame 438. Initially, marker 232 may be positioned at end 220 and evaluation image 160 may correspond to frame 438. User 102 may move marker 232 in first direction 202 or second direction 204 to create user input 170. If user 102 stops moving marker 232 at point 214, user input 170 may include an indication of point 214 corresponding to application of one of the three skins Processor 110 may analyze user input 170 and may identify the indication of point 214. In response to the analysis, processor 110 may retrieve intermediate image data 435 from memory 112 and may output intermediate image 436 in display region 152. If user 102 stops moving marker 232 at point 216, corresponding to application of two of the three skins, user input 170 may include an indication of point 216. Processor 110 may analyze user input 170 and may identify the indication of point 216. In response to the analysis, processor 110 may retrieve intermediate image data 435 from memory 112 and may output intermediate image 436 in display region 152. User 102 may continue to move marker 232 to evaluate one or more skins relating to frame 438.

Figure 5:
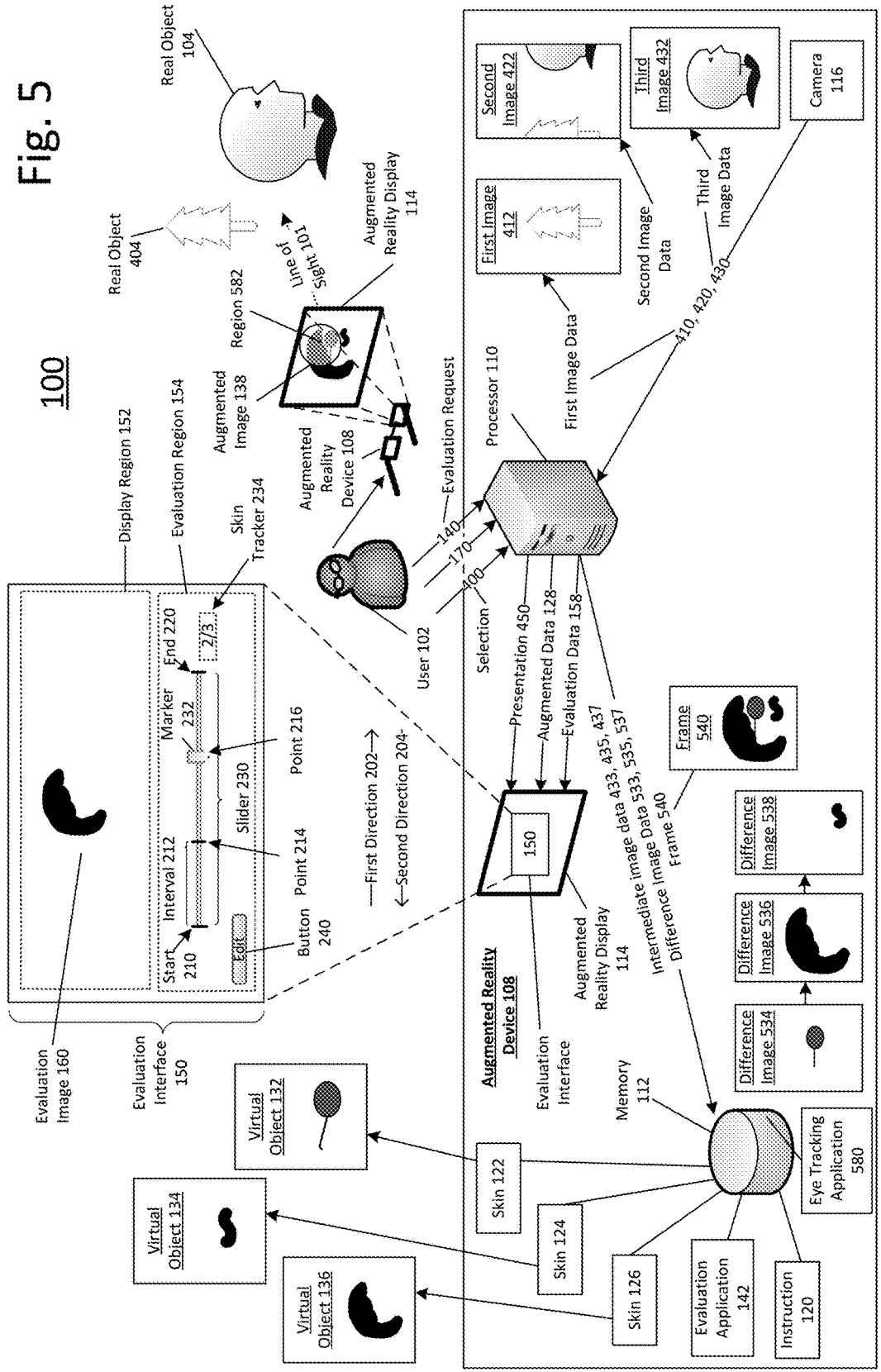
FIG. 5 illustrates the example system of FIG. 1 with additional detail relating to another example implementation where differences between intermediate images are stored in the memory.

FIG. 5 illustrates the example system of FIGS. 1, 2, 3 and 4 with additional detail relating to another example implementation where differences between intermediate images are stored in the memory, arranged in accordance with at least some embodiments described herein. FIG. 5 is substantially similar to system 100 of FIGS. 1, 2, 3 and 4 with additional details. Those components in FIG. 5 that are labeled identically to components of FIGS. 1, 2, 3 and 4 will not be described again for the purposes of clarity.

In another example, as discussed in more detail below, processor 110 may store differences between intermediate images, or between an intermediate image and an initial image, produced by application of skins. These differences may be reviewed by a user to identify undesired features or attributes in a skin. Processor 110 may apply a first skin to the received image data to generate a first intermediate image data. Processor 110 may determine a first difference image data between the first intermediate image data and the received image data. Processor 110 may store the first difference image data in memory 112. Processor 110 may apply a second skin to the first intermediate image data to generate a second intermediate image data. Processor 110 may determine a second difference image data between the first intermediate image data and the second intermediate image data. Processor 110 may store the second difference image data in memory 112. Processor 110 may continue to apply subsequent skins to a prior intermediate image data until a last skin is applied to produce a frame of augmented data. In response to application of the last skin, processor 110 may generate a frame and may store the generated frame in memory 112. Each difference image data determined by processor 110 may also be stored in memory 112. User 102 may navigate through frames stored in memory 112 to select a frame for evaluation. In response to selection of a frame, user 102 may use evaluation interface 150 to evaluate a particular skin relating to the selected frame. Storage of difference image data, instead of intermediate image data, may reduce an amount of data stored in memory 112.

In the example, processor 110 may retrieve first image data 410 from camera 116. Processor 110 may determine that no skin stored in memory 112 may be applied to first image data 410. In response to the determination that no skin may be applied to first image data 410, processor 110 may determine that no difference image data may be generated.

Processor 110 may continue to retrieve second image data 420 from camera 116. Processor 110 may determine that no skin stored in memory 112 may be applied to second image data 420. In response to the determination that no skin may be applied to second image data 420, processor 110 may determine that no difference image data may be generated. Processor 110 may continue to retrieve third image data 430 from camera 116.

In response to processor 110 retrieving third image data 430 from camera 116, processor 110 may analyze the processing sequence in instruction 120. Processor 110 may retrieve skin 122 from memory 112. Processor 110 may identify a first reference point (an eye of real object 104) in third image data 430. Processor 110 may apply skin 122 to third image data 430 and may generate intermediate image data 433 in response. Processor 110 may determine difference image data 533 such as by subtracting third image data 430 from intermediate image data 433. Difference image data 533, when rendered such as by processor 110, may produce a difference image 534. Processor 110 may store difference image data 533 in memory 112.

Processor 110 may analyze the processing sequence in instruction 120 and may retrieve skin 126 from memory 112. Processor 110 may identify a second reference point (a forehead of real object 104) in intermediate image data 433. Processor 110 may apply skin 126 to intermediate image data 433 and may generate intermediate image data 435 in response. Processor 110 may determine difference image data 535 such as by subtracting intermediate image data 433 from intermediate image data 435. Difference image data 535, when rendered by processor 110, may produce a difference image 536. Processor 110 may store difference image data 535 in memory 112.

Similarly, processor 110 may analyze the processing sequence in instruction 120 and may retrieve skin 124 from memory 112. Processor 110 may identify a third reference point (a mouth of real object 104) in intermediate image data 435. Processor 110 may apply skin 124 to intermediate image data 435 and may generate intermediate image data 437 in response. Processor 110 may determine difference image data 537 such as by subtracting intermediate image data 435 from intermediate image data 437. Difference image data 537, when rendered such as by processor 110, may produce a difference image 538. Processor 110 may determine that skin 124 is a last skin in the processing sequence of instruction 120. In response to the determination that skin 124 is the last skin in the processing sequence, processor 110 may generate frame 540. Processor 110 may also store difference image data 537 and frame 540 in memory 112.

In the example, user 102 may wish to evaluate a particular skin. User 102 may send evaluation request 140 to processor 110. In response to receiving evaluation request 140, processor 110 may output presentation 450 to augmented reality display 114. User 102 may view presentation 450 on augmented reality display 114. Presentation 450 may include one or more frames such as frame 540. User 102 may create selection 400 such as by selecting frame 540 among the one or more frames in presentation 450. Processor 110 may receive selection 400 from user 102. In response to receiving selection 400, processor 110 may generate evaluation data 158. Evaluation data 158 may include an indication of frame 540. Processor 110 may output evaluation interface 150 and may send evaluation data 158 to augmented reality display 114 to display evaluation image 160 in display region 152.

In the example, user 102 may use evaluation interface 150 to evaluate frame 540. Initially, marker 232 may be positioned at end 220 and evaluation image 160 may correspond to difference image 538. User 102 may move marker 232 in first direction 202 or second direction 204 to create user input 170. If user 102 stops moving marker 232 at point 214, user input 170 may include an indication of point 214. Processor 110 may analyze user input 170 and may identify the indication of point 214. In response to the analysis, processor 110 may retrieve difference image data 533 from memory 112 and may output difference image 534 in display region 152. If user 102 stops moving marker 232 at point 216, user input 170 may include an indication of point 216. Processor 110 may analyze user input 170 and may identify the indication of point 216. In response to the analysis, processor 110 may retrieve difference image data 535 from memory 112 and may output difference image 536 in display region 152. User 102 may continue to move marker 232 to evaluate one or more skins relating to frame 538.

In some examples, processor 110 may be configured to store portions of image data and/or frames based on an eye tracking application 580 stored in memory 112. Eye tracking application 580 may include instructions for processor 110 to track one or more eyes of user 102. Processor 110 may track an eye of user 102 to identify a region 582 within the boundaries of augmented reality display 114. In an example, when user 102 is viewing real object 104 using augmented reality device 108, region 582 may include the reference points such as the forehead and mouth of real object 104 as depicted. Based on instructions in eye tracking application 580, processor 110 may store intermediate image data or difference image data that include skins whose reference points are within region 582. In some examples, processor 110 may reduce an image quality, such as a resolution, of portions of a stored image data in memory 112 in order to reduce an amount of data stored in memory 112. For example, when storing intermediate image data or difference image data, processor 110 may reduce the resolution of pixels that are outside of region 582.

Among other possible benefits, a system in accordance with the disclosure may allow users to evaluate augmented reality skins. Also, the system may allow users to debug augmented reality skins The system may also provide security to users of augmented reality devices. In the example where the system is configured to store image data relating to skin applications, users of augmented reality devices may evaluate prior frames seen on the augmented reality display to determine whether a current visible augmented image is suspicious.

Figure 6:
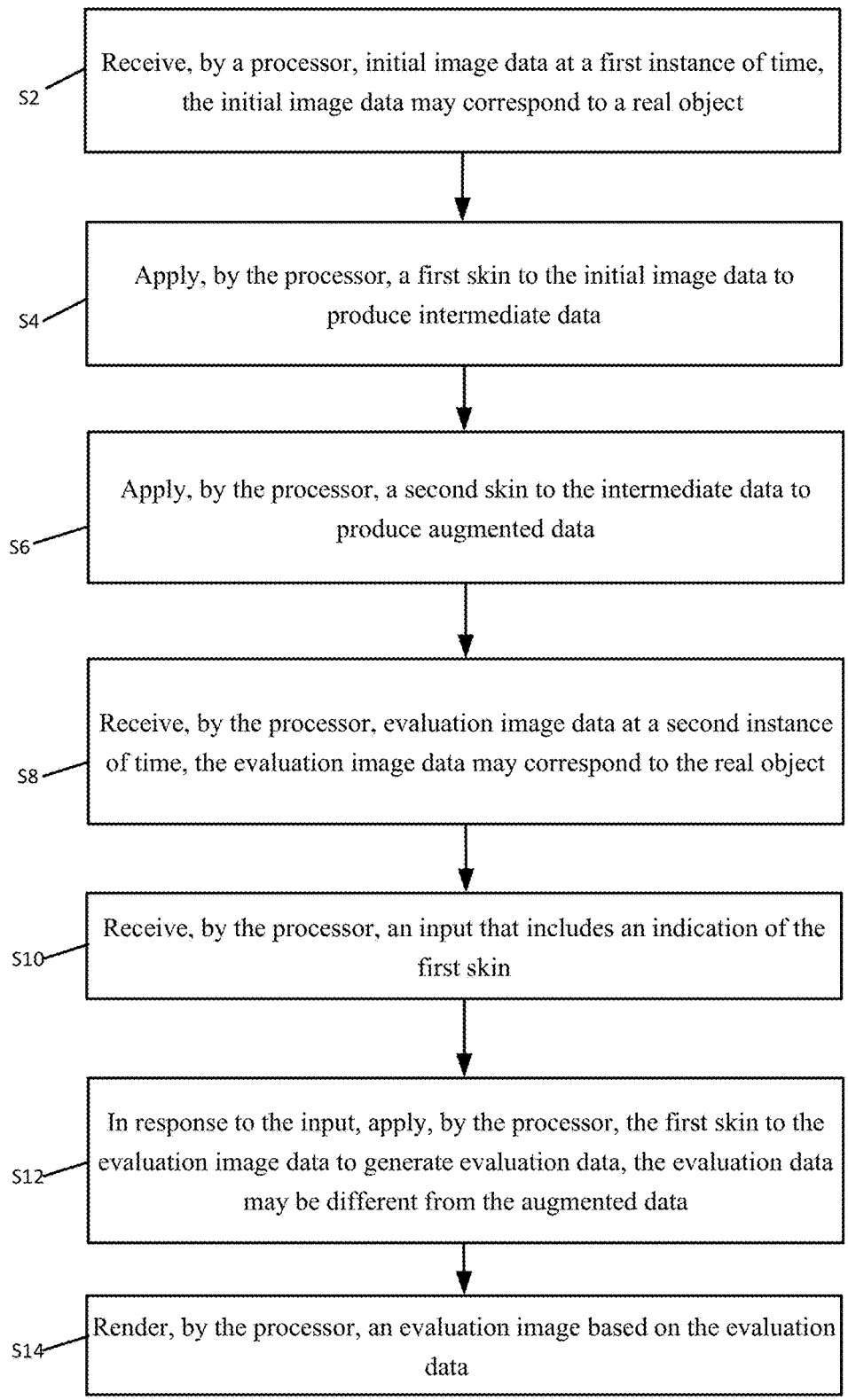
FIG. 6 illustrates a flow diagram for an example process for implementing augmented reality skin evaluation.

FIG. 6 illustrates a flow diagram for an example process for implementing augmented reality skin evaluation, arranged in accordance with at least some embodiments presented herein. The process in FIG. 6 could be implemented using, for example, system 100 discussed above. An example process may include one or more operations, actions, or functions as illustrated by one or more of blocks S2, S4, S6, S8, S10, S12 and/or S14. Although illustrated as discrete blocks, various blocks may be divided into additional blocks, combined into fewer blocks, or eliminated, depending on the desired implementation.

Processing may begin at block S2, "Receive, by a processor, initial image data at a first instance of time, the initial image data may correspond to a real object." At block S2, a processor may receive initial image data at a first instance of time. The initial image data may correspond to a real object.

Processing may continue from block S2 to block S4, "Apply, by the processor, a first skin to the initial image data to produce intermediate data." At block S4, the processor may apply a first skin to the initial image data to produce intermediate data. The first skin may include instructions and skin data.

Processing may continue from block S4 to block S6, "Apply, by the processor, a second skin to the intermediate data to produce augmented data." At block S6, the processor may apply a second skin to the intermediate data to produce augmented data.

Processing may continue from block S6 to block S8, "Receive, by the processor, evaluation image data at a second instance of time, the evaluation image data may correspond to the real object." At block S8, the processor may receive evaluation image data at a second instance of time. The evaluation image data may correspond to the real object.

Processing may continue from block S8 to block S10, "Receive, by the processor, an input that includes an indication of the first skin." At block S10, the processor may receive an input that includes an indication of the first skin. In some examples, the input may include an identification of an area in the evaluation image data. In some examples, the input may include a position of a marker in a user interface. In some examples, prior to receipt of the input, the processor may render an augmented image based on the augmented data.

Processing may continue from block S10 to block S12, "In response to the input, apply, by the processor, the first skin to the evaluation image data to generate evaluation data, the evaluation data being different from the augmented data." At block S12, in response to the input, the processor may apply the first skin to the evaluation image data to generate evaluation data. The evaluation data may be different from the augmented data.

Application of the first skin to the evaluation image data may include identifying a reference point in the evaluation image data based on the instruction of the first skin and associating a portion of the evaluation image data with the reference point. Application of the first skin to the evaluation image data may also include replacing the portion of the evaluation image data with the skin data. Application of the first skin to the evaluation image data may include determining that the reference point corresponds to the area identified in the input.

Processing may continue from block S12 to block S14, "Render, by the processor, an evaluation image based on the evaluation data." At block S14, the processor may render an evaluation image based on the evaluation data.

FIG. 7 illustrates an example computer program product 700 that can be utilized to implement augmented reality skin evaluation, arranged in accordance with at least some embodiments described herein. Program product 700 may include a signal bearing medium 702. Signal bearing medium 702 may include one or more instructions 704 that, when executed by, for example, a processor, may provide the functionality described above with respect to FIGS. 1-6. Thus, for example, referring to system 100, processor 110 may undertake one or more of the blocks shown in FIG. 6 in response to instructions 704 conveyed to the system 100 by medium 702.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc.

In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, program product 700 may be conveyed to one or more modules of the system 100 by an RF signal bearing medium 702, where the signal bearing medium 702 is conveyed by a wireless communications medium 710 (e.g., a wireless communications medium conforming with the IEEE 802.11standard).

FIG. 8 is a block diagram illustrating an example computing device 800 that is arranged to implement augmented reality skin evaluation, arranged in accordance with at least some embodiments described herein. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (μP), a microcontroller (μC), a digital signal processor (DSP), or any combination thereof Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof System memory 806 may include an operating system 820, one or more applications 822, and program data 824. Application 822 may include a augmented reality skin evaluation algorithm 826 that is arranged to perform the functions as described herein including those described with respect to system 100 of FIGS. 1-7. Program data 824 may include augmented reality skin evaluation data 828 that may be useful for implementation of augmented reality skin evaluation as is described herein. In some embodiments, application 822 may be arranged to operate with program data 824 on operating system 820 such that implementations of augmented reality skin evaluation may be provided. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will also be understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim 1ncludes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to produce an evaluation image, the method comprising, by a processor:

receiving initial image data at a first instance of time, wherein the initial image data corresponds to a real object;

applying a first skin to the received initial image data to produce first intermediate image data that corresponds to the first skin;

determine first difference image data between the first intermediate image data and the received initial image data for identification of the first skin;

applying a second skin to the first intermediate image data to produce augmented data;

determine second difference image data between the augmented data and the first intermediate image data for identification of the second skin;

rendering an augmented image based on the augmented data;

receiving a first input to evaluate at least one of the first skin or the second skin in the rendered augmented image;

displaying an evaluation image that corresponds to a first difference image related to the first difference image data or that corresponds to a second difference image related to the second difference image data, wherein the first difference image is displayed when the received first input corresponds to the evaluation of the first skin, and wherein the second difference image is displayed when the received first input corresponds to the evaluation of the second skin;

receiving a second input to modify the first skin in the first difference image when the first difference image is displayed, or to modify the second skin in the second difference image when the second difference image is displayed;

in response to receiving the second input, modifying the first skin in the first difference image when the first difference image is displayed, or modifying the second skin in the second difference image when the second difference image is displayed;

applying the modified first skin or the modified second skin to the augmented image; and rendering the augmented image with one of the modified first skin or the modified second skin.

2. The method of claim 1, wherein receiving the first input includes identifying a position of a marker in a user interface.

3. The method of claim 1, wherein the first skin includes instructions and skin data.

4. The method of claim 1, wherein receiving the first input to evaluate at least one of the first skin or the second skin in the rendered augmented image comprises receiving the first input that corresponds to an area having an attribute that is different from an attribute of rest of the rendered augmented image.

5. The method of claim 1, wherein modifying the first skin in the first difference image or the second skin in the second difference image includes at least one of repositioning, resizing, and removing of the first skin or the second skin.

6. The method of claim 1, further comprising:
in response to receiving the first input to evaluate at least one of the first skin or the second skin, retrieving the first difference image or the second difference image.

7. A system effective to produce an evaluation image, the system comprising:
a memory;
a camera;
an augmented reality display; and
a processor configured to be in communication with the memory, the camera, and the augmented reality display, wherein:
the camera is configured to capture initial image data at a first instance of time, wherein the initial image data corresponds to a real object, and
the processor is configured to:
store the initial image data in the memory;
apply a first skin to the initial image data to produce first intermediate image data that corresponds to the first skin;
determine first difference image data between the first intermediate image data and the initial image data for identification of the first skin;
apply a second skin to the first intermediate image data to produce augmented data;
determine second difference image data between the augmented data and the first intermediate image data for identification of the second skin;
render an augmented image based on the augmented data on the augmented reality display;
receive a first input to evaluate at least one of the first skin or the second skin in the rendered augmented image;
display an evaluation image that corresponds to a first difference image related to the first difference image data or that corresponds to a second difference image related to the second difference image data, wherein the first difference image is displayed when the received first input corresponds to the evaluation of the first skin, and wherein the second difference image is displayed when the received first input corresponds to the evaluation of the second skin;
receive a second input to modify the first skin in the first difference image when the first difference image is displayed, or to modify the second skin in the second difference image when the second difference image is displayed;

in response to the received second input, modify the first skin in the first difference image when the first difference image is displayed, or modify the second skin in the second difference image when the second difference image is displayed;
apply the modified first skin or the modified second skin to the augmented image; and
render the augmented image with one of the modified first skin or the modified second skin.

8. The system of claim 7, wherein receipt of the first input includes identification of a position of a marker in a user interface.

9. The system of claim 7, wherein the augmented reality display includes a marker movable along a slider in a first direction and a second direction.

10. The system of claim 9, wherein the marker is movable along the slider to apply a particular skin to a particular image data.

11. The system of claim 7, wherein modification of the first skin in the first difference image or the second skin in the second difference image includes at least one of repositioning, resizing, and removing of the first skin or the second skin.

12. The system of claim 7, further comprising:
in response to receiving the first input to evaluate at least one of the first skin or the second skin, retrieving the first difference image or the second difference image.

13. A method to produce an evaluation image, the method comprising, by a processor:
identifying augmented reality instructions effective to:
apply a first skin to initial image data to produce first intermediate image data, wherein the initial image data corresponds to a real object; and
apply a second skin to the first intermediate image data to produce augmented data;
rendering an augmented image based on the augmented data;
receiving a first input to evaluate the augmented image, wherein the first input corresponds to an area in the rendered augmented image;
receiving evaluation image data, wherein the evaluation image data corresponds to the real object and includes the area of the rendered augmented image;
receiving a second input based on a positioning of a marker to a first position in a slider to apply one of the first skin and the second skin to the evaluation image data;
in response to the second input, applying one of the first skin and the second skin to the evaluation image data to generate evaluation data, wherein the evaluation data is different from the augmented data;
rendering the evaluation image based on the evaluation data, wherein the evaluation image corresponds to a first difference image that is displayed when the received first input corresponds to an evaluation of the first skin in the augmented image, and wherein the evaluation image corresponds to a second difference image that is displayed when the received second input corresponds to the evaluation of the second skin in the augmented image.

14. The method of claim 13, wherein:
the first skin includes instructions and skin data;
applying the first skin to the evaluation image data comprises:
identifying a reference point in the evaluation image data based on the instructions;

associating a portion of the evaluation image data with the reference point; and replacing the portion of the evaluation image data with the skin data; and receiving the first input includes:

receiving an identification of an area in the evaluation image data; and determining that the reference point corresponds to the area identified in the first input.

15. The method of claim 13, wherein receiving the first input to evaluate the augmented image comprises receiving the first input that corresponds to an area having an attribute that is different from an attribute of rest of the rendered augmented image.

* * * * *